UnitedStates Patent Office 3,553,571
Patented Jan. 5, 1971

3,553,571
DEVICE INCLUDING DIRECTION RESPONSIVE SWITCHING MEANS FOR INDICATING AND PROTECTING AGAINST SHORT-CIRCUITS IN A DC VOLTAGE NETWORK
Alfons Fendt, Erlangen, and Michael Becker, Uttenreuth, Germany, assignors to Siemens Aktiengesellschaft, a corporation of Germany
Filed Dec. 10, 1968, Ser. No. 782,642
Claims priority, application Germany, Dec. 12, 1967, 1,588,805
Int. Cl. G01r 31/02, 31/08
U.S. Cl. 324—52
9 Claims

ABSTRACT OF THE DISCLOSURE

A direction-responsive switch is coupled to a control system for selectively actuating controls in reponse to the occurrence and direction of a short-circuit in a DC voltage network. The switch is coupled to a voltage component connected in the network for providing a voltage in proportion to the current in the network to actuate the switch upon the voltage provided by the voltage component exceeding a predetermined magnitude thereby indicating the occurrence of a short-circuit in the network.

---

The present invention relates to a short-circuit device. More particularly, the invention relates to a selective short-circuit device for a DC voltage network.

DC voltage lines and DC voltage networks are even better suited than three-phase lines for high voltage power transmission for very long distances at upwards of 400 kilovolts. Protective devices provided for single and three-phase AC lines cannot be utilized to protect DC voltage lines or networks from the adverse effects of a short-circuit and to insure selective disconnection of the effected line section only. A transfer resistor at the fault location, for example, which is always present, for example, in arc flashovers, would falsify a resistance measurement at direct current. Furthermore, the conventional methods for distance protection of three-phase lines, used to compensate for a line fault, are not applicable to direct current. Also, in direct voltage transmission lines, control devices are provided at the frequency conversion stations. Such devices operate relatively rapidly and thus affect the curve of a short-circuit current, following a fault, and may falsify a measurement result. Moreover, the load current of the DC voltage lines may lead to an incorrect measurement of the distance of the fault based on a resistance measurement.

A known arrangement for short-circuit protection of a DC line in a two-phase operation utilizes an undervoltage relay. The relay responds to the voltage in the DC line, and when said voltage does not reach a predetermined magnitude, said relay disconnects or opens the line. It is impossible, however, to selectively disconnect a short-circuit in a DC network having more than two terminal points by utilizing an undervoltage relay.

The principal object of the present invention is to provide a new and improved selective short-circuit device for a DC voltage network.

An object of the present invention is to provide a selective short-circuit device for a DC voltage network, which device functions to compensate and perform desired functions in response to a short-circuit in the network.

An object of the present invention is to provide a selective short-circuit device for a DC voltage network, which device functions to perform desired functions in response to a short-circuit in the network with efficiency, effectiveness and reliability.

An object of the present invention is to provide a selective short-circuit device for a DC voltage network, which device is of simple structure.

In accordance with the present invention, the selective short-circuit device protects against short-circuits in DC voltage network. The device utilizes a protective relay which initiates compensating processes directly following a short-circuit. The relay or direction-responsive switching device is connected to a voltage source via a capacitor. The voltage source provides a voltage which is proportional to the line current. The output contacts of the direction-responsive switching device are provided for each direction and each is connected to a signalling or control line which indicates that a short-circuit has occurred or disconnects or opens a power switch.

A second direction-responsive switching device may be connected to a voltage source via a capacitor. The voltage source provides a voltage which is proportional to the current in the network. The second switching device is connected to the voltage source via a capacitor. The output contact of the second switching device is connected to a control line. The second switching device eliminates a fault in sudden variations to a reliable degree. Current variations in the network actuate the short-circuit protection device upon the occurrence of a sudden undervoltage.

In accordance with the present invention, a selective short-circuit device for a DC voltage network comprises voltage means connected in the network for providing a voltage in proportion to the current in the network. Control apparatus is provided which is adapted to perform predetermined functions in response to a short-circuit in the network. A direction-responsive switching device is coupled to the control apparatus for selectively actuating the control apparatus in response to the occurrence and direction of a short-circuit in the network. A coupling couples the direction-responsive switching device to the voltage means for actuating the direction-responsive switching device upon the voltage provided by the voltage means exceeding a predetermined magnitude thereby indicating the occurrence of a short-circuit in the network.

The voltage means comprises a resistor connected in the network. The coupling comprises a capacitor, a resistor and a transformer. The transformer has a primary winding connected in series circuit arrangement with the capacitor and the resistor across the voltage means and a secondary winding connected to the direction-responsive switching device. The direction-responsive switching device comprises a polarized relay.

The direction-responsive device may comprise a relay and adjusting means connected to the relay for adjusting the magnitude of voltage to which the relay responds. The adjusting means comprises a potentiometer. A maximum indicating device is connected to the direction-responsive switching device for measuring the voltage applied to the direction-responsive switching devce and indicating the distance therefrom of a short-circuit in the network from the voltage means.

An additional direction-responsive switching device is coupled to the control apparatus for actuating the control apparatus in response to the occurrence of a short-circuit in the network. Additional voltage means is connected to the network for providing a voltage in proportion to the current in the network. An additional coupling couples the additional direction-responsive switching device to the additional voltage means for actuating the additional direction-responsive switching device upon the voltage provided by the additional voltage means exceeding a predetermined magnitude thereby indicating the occurrence of a short-circuit in the network.

The additional direction-responsive switching device comprises an additional relay. The additional voltage means comprises a voltage divider connected between the network and a point at ground potential. The additional coupling comprises a capacitor connected between the additional relay and the voltage divider. The additional voltage source comprises a voltage divider connected between the network and a point at ground potential, a potentiometer connected in the voltage divider in series therewith and regulating means coupled to the potentiometer for controlling the voltage provided by the potentiometer in accordance with a reference voltage. The additional coupling couples the additional direction-responsive switching device to the potentiometer of the additional voltage means.

In order that the present invention may be readily carried into effect, it will now be described with reference to the accompanying drawing, wherein.

In the figures, the same components are identified by the same reference numerals.

Figure 1:
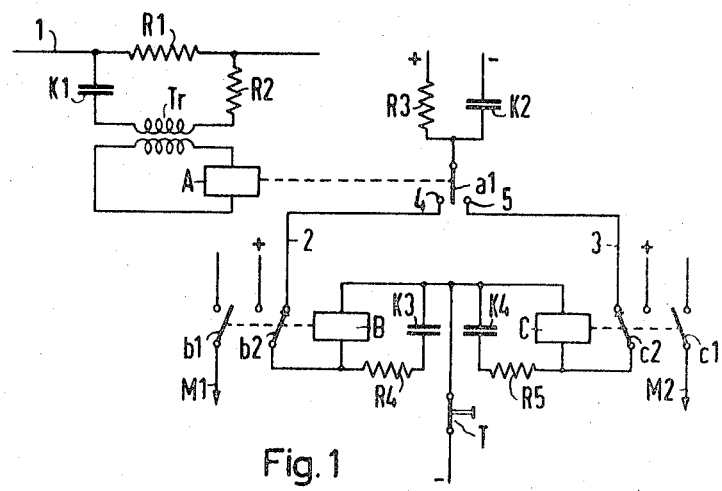
FIG. 1 is a circuit diagram of an embodiment of the selective short-circuit device of the present invention.

In FIG. 1, a resistor R1 is connected in a DC line 1 and has a voltage drop which corresponds to the current flowing in said line. The resistor R1 thus constitutes a voltage source which provides a voltage proportional to the line current. A capacitor K1, the primary winding of a transformer Tr and a second resistor R2 are connected in series circuit arrangement and said series circuit arrangement is connected across the resistor R1. The series circuit arrangement K1, Tr, R2 functions to adjust the time constant of the circuit.

A direction-responsive switching device or polarized relay A is connected in series with the secondary winding of the transformer Tr. The energizing winding of the relay A, which is connected to the secondary winding of the transformer Tr, controls the operation or positions of a contact $a1$. The contact $a1$ is connected in a selective circuit and energizes one of two relays B and C, in accordance with its switching position. The relay B, when energized, closes a contact $b1$ in a signalling or control line M1 to close said line. The relay C, when energized, closes a contact C1 in a signalling or control line M2 to close said line.

The signalling or control lines M1 and M2 may be connected with indicating instruments which show the direction of the short-circuit current, as well as with circuits which disconnect or open individual portions of the DC network. Furthermore, the short-circuit protective device of FIG. 1, may be interconnected, in a known manner, with an additional similarly constructed device for the purpose of insuring the direction indication.

In operation, when a short-circuit occurs to the right or to the left of the resistor R1 in the DC line 1, a voltage variation occurs at said resistor. The polarity and magnitude of the voltage across the resistor R1 depends upon the location of the short-circuit point. The variation in voltage produces a reloading process in the current circuit of the capacitor K1 and the resistor R2, so that a current flows through the primary winding of the transformer Tr. As a result, the polarized relay A responds in one or the other direction, in accordance with the direction of the fault relative to the resistor R1.

The contact $a1$ of the relay A is connected at its fixed end in common with a capacitor K2, which is connected to the negative terminal "—" of an auxiliary direct voltage source, and a resistor R3 having a high resistance, which is connected to the positive terminal "+" of the auxiliary voltage source. The capacitor K2 is thus charged to the voltage of the auxiliary voltage source + —, when the contact $a1$ is in its neutral position.

When the free end of the contact $a1$ makes electrical contact at one of its contact positions, the capacitor K2 dicharges via a line 2 or 3 and the corresponding one of the contacts $b2$ and $c2$ of the relays B and C, respectively. The discharge current subsequently flows through a key T to the negative terminal "—" of the auxiliary voltage source. A capacitor K3 is connected in series circuit arrangement with a resistor R4 and said series circuit arrangement is connected in parallel with the energizing winding of the relay B. A capacitor K4 is connected in series circuit arrangement with a resistor R5 and said series circuit arrangement is connected in parallel with the energizing winding of the relay C.

If the contact $a1$ makes electrical contact with the terminal 4 of the line 2, the discharge current of the capacitor K2 flows to the capacitor K3 via the line 2, and charges the capacitor K3. The capacitor K3 discharges through the relay B, thereby energizing said relay, even when the contact of the contact $a1$ and the terminal 4 is brief. If the contact $a1$ makes electrical contact with the terminal 5 of the line 3, the discharge current of the capacitor K2 flows to the capacitor K4 via the line 3, and charges the capacitor K4. The capacitor K4 discharges through the relay C, thereby energizing said relay, even when the contact of the contact $a1$ and the terminal 5 is brief.

When the relay B is energized, its contact $b1$ closes the signalling line M1 and its contact $b2$ is moved to its operating position. The free end of the contact $b2$ is connected, in the operating position of said contact, to the positive terminal "+" of the auxiliary voltage source, so that the relay B is then self-holding, via its contact $b2$. When the relay C is energized, its contact $c1$ closes the signalling line M2 and its contact $c2$ is moved to its operating position. The free end of the contact $c2$ is connected, in the operating position of said contact, to the positive terminal "+" of the auxiliary voltage source, so that the relay C is then self-holding, via its contact $c2$.

Each of the relays B and C is deenergized, and its self-holding is cancelled when the key T is opened. The key T may be replaced by a relay contact which may be utilized to cancel the self-holding and deenergize the energized relay B or C, if restoration is to be automatically effected. After the contact $a1$ of the polarized relay A has made electrical contact with the terminal 4 or 5, the capacitor K2 is discharged. The resistor R3 has such a high resistance that a specific time elapses before said capacitor recharges. Consequently, a reversal of the contact $a1$ into its opposite position, immediately following the indication of a short-circuit direction, cannot cause energization of the deenergized one of the relays B and C. Thus, the first current variation which follows the occurrence of a short-circuit in the DC line 1 is clearly evaluated and is maintained in the condition of energization of the relays B and C.

Although each of the direction-responsive switching device A and the switching devices B and C is disclosed as a relay each of said relays may be readily replaced by a bistable multivibrator or flip-flop.

Figures 2, 3:
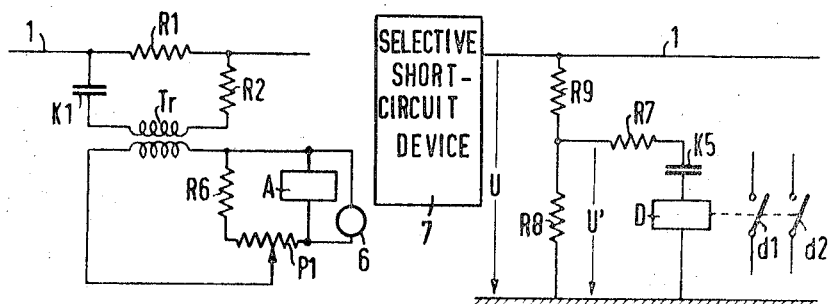
FIG. 2 is a circuit diagram of a modification of the embodiment of FIG. 1.
FIG. 3 is a circuit diagram of another embodiment of the selective short-circuit device of the present invention.

In the modification of FIG. 2, an additional resistor R6 is connected at one end terminal in common to one end terminal of the secondary winding of the transformer Tr and to a terminal of the energizing winding of the polarized relay A and is connected at its other end terminal to one end terminal of a potentiometer P1. The other end terminal of the potentiometer P1 is connected to the other end terminal of the energizing winding of the relay A. The other end terminal of the secondary winding of the transformer Tr is connected to the movable contact of the potentiometer P1.

The current provided by the secondary winding of the transformer Tr is distributed between the resistor R6 and the relay A. The potentiometer P1 functions to adjust or regulate the current distribution between the polarized relay A and the resistor R6. The current adjustment may be effected either continually or in stages. This makes it possible to determine a specific minimum steepness for the current variation which actuates or energizes the protection device.

The resistor R1 may be replaced in the conductor 1 of the DC network by an inductance. The advantage of an inductance is that no voltage drop occurs therein during neutral operation. The proportionality between the current flowing through the line 1 and the voltage of the inductance occurs only during the brief compensating processes following a fault. The period following a short-circuit or fault is the period of operation of the selective short-circuit device of the present invention.

It is also possible to connect a measuring instrument with a maximum indication to the energizing winding of the polarized relay A. The measuring instrument or maximum indicating device such as, for example, the device 6 of FIG. 2, may comprise, for example, a voltmeter. The maximum indicating device 6 measures the voltage applied to the relay A and may determine the degree of steepness of a compensating process. Since the wave front is flattened in such compensating processes at a greater distance of the fault from the voltage source R1, the indication of the maximum measuring instrument 6 permits a determination of the distance of the fault from the measuring point. When the short-circuit device of the present invention is utilized for distance protection, without a direction comparison by means of a similar measuring device at the opposite end of the line, the response magnitude may be adjusted in such a manner by the potentiometer P1 or FIG. 2, that a fault or short-circuit will be indicated or a faulted or short-circuited section will be disconnected only along a specific protected measured path.

Faulty operation of the selective short-circuit device of the present invention is prevented during load surges or rapid control processes by an additional control contact connected in the signalling line M1 and/or M2. The additional control contact closes the signalling circuit in which it is connected only if an additional selective short-circuit device, which controls said control contact, determines that a short-circuit or fault has occurred in the DC line 1. Basically, any circuit suitable for fault detection may be utilized as the additional selective short-circuit device.

As shown in FIG. 3, the additional selective short-circuit device preferably comprises an additional direction-responsive switching device or polarized relay D. The circuit of FIG. 3 is connected to the DC line 1 in addition to the circuit of FIG. 1, indicated as a selective short-circuit device 7. The polarized relay D is connected to an additional voltage source comprising a voltage divider having a pair of resistors R8 and R9 connected in series between the DC line 1 and ground e. The energizing winding of the relay D is connected to the voltage divider R8, R9 via a capacitor K5 and a resistor R7 connected in series circuit arrangement.

The polarized relay D is thus connected in series with the capacitor to a voltage U', which is proportional to the voltage U, between the DC conductor 1 of the DC network and ground. The energizing winding of the relay D controls the operation or positions of contacts d1 and d2. Each of the contacts d1 and d2 is connected in a corresponding one of the signalling lines M1 and M2 (FIG. 1). Since the polarized relay D responds to direction, the contacts d1 and d2 may be made to close only when a voltage variation occurs in the sense of preventing the line to ground voltage U, so that an increase in said voltage will have no effect upon said contacts.

Figure 4:
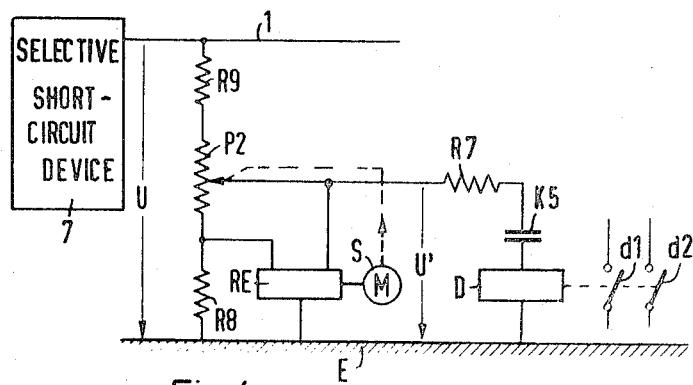
FIG. 4 is a circuit diagram of a modification of the embodiment of FIG. 3.

When the operating voltage is decreased, it may be that an occurring voltage variation, which follows a short-circuit, will also be less steep than when a rated voltage is present in the line. In order to insure that the polarized relay D will respond without fail in the aforedescribed case, a potentiometer P2 may be connected in the voltage divider R8, R9 of FIG. 3 in series therewith, as illustrated in FIG. 4. A regulating system is coupled to the potentiometer P2 and functions to control the voltage provided by said potentiometer in accordance with a reference voltage.

The regulating system of the modification of FIG. 4 comprises a regulating device or comparator RE. A regulating motor S is operated by the regulating device RE and is coupled to the movable contact of the potentiometer P2. The motor S moves the movable contact of the potentiometer P2 to vary the proportionality between the voltage U and the voltage U'. A specifically predetermined voltage U' is applied to the regulating device RE as a reference value. The actual voltage value is derived at the resistor R8, so that the magnitude of the output signal of the regulating device RE will always act upon the motor S in such a way that, regardless of the line to ground voltage U, a constant voltage U' will always be applied to the short-circuit protecting device R7, K5, D. As a result, even when the voltage between the line 1 and ground E decreases due to the occurrence of short-circuit in the line, the voltage variation which occurs has the same magnitude as the prevailing rated voltage. Instead of a continuous control of the voltage U', a step by step control may be provided in some cases.

The protective device of the present invention against short-circuits responds to a current variation or a voltage variation. The short-circuit device may be connected to timing elements at its output. The timing elements indicate output signals of specific duration, if output signals of a specific duration are utilized. When the short-circuit device of the present invention is utilized to protect bus bars, several units of the invention may determine whether there is a fault in a bus bar, or elswhere, by comparing the short-circuit directions in the branches.

While the invention has been described by means of specific examples and in specific embodiments, we do not wish to be limited thereto, for obvious modifications will occur to those skilled in the art without departing from the spirit and scope of the invention.

We claim:

1. A selective short-circuit device for a DC voltage network, comprising:
   voltage means connected in said network for providing a voltage in proportion to the current in said network;
   control means adapted to perform predetermined functions in response to a short-circuit in said network;
   direction-responsive switching means coupled to said control means for selectively actuating said control means in response to the occurrence and direction of a short-circuit in said network; and
   coupling means coupling said direction-responsive switching means to said voltage means for actuating said direction-responsive switching means upon the voltage provided by said voltage means exceeding a predetermined magnitude thereby indicating the occurrence of a short-circuit in said network, said coupling means comprising a capacitor, a resistor and a transformer, said transformer having a primary winding connected in series circuit arrangement with said capacitor and said resistor across said voltage means and a secondary winding connected to said direction-responsive switching means.

2. A selective short-circuit device as claimed in claim 1, wherein said voltage means comprises a resistor connected in said network.

3. A selective short-circuit device as claimed in claim 1, wherein said direction-responsive switching means comprises a polarized relay.

4. A selective short-circuit device as claimed in claim 1, wherein said direction-responsive switching means comprises a relay and adjusting means connected to said relay for adjusting the magnitude of voltage to which said relay responds.

5. A selective short-circuit device as claimed in claim 1, wherein said direction-responsive means comprises a relay and potentiometer means connected to said relay for adjusting the magnitude of voltage to which said relay responds.

6. A selective short-circuit device as claimed in claim 1, further comprising maximum indicating means connected to said direction-responsive switching means for measuring the voltage applied to said direction-responsive switching means and indicating the distance therefrom of a short-circuit in the network from said voltage means.

7. A selective short-circuit device as claimed in claim 1, further comprising additional direction-responsive switching means coupled to said control means for actuating said control means in response to the occurrence of a short-circuit in said network, additional voltage means connected to said network for providing a voltage in proportion to the current in said network, and additional coupling means coupling said additional direction-responsive switching means to said additional voltage means for actuating said additional direction-responsive switching means upon the voltage provided by said additional voltage mean exceeding a predetermined magnitude thereby indicating the occurrence of a short-circuit in said network.

8. A selective short-circuit device as claimed in claim 7, wherein said additional direction-responsive switching means comprises an additional relay, said additional voltage means comprises a voltage divider connected between said network and a point at ground potential, and said additional coupling means comprises a capacitor connected between said additional relay and said voltage divider.

9. A selective short-circuit device as claimed in claim 7, wherein said additional voltage means comprises a voltage divider connected between said network and a point at ground potential, a potentiometer connected in said voltage divider in series therewith and regulating means coupled to said potentiometer for controlling the voltage provided by said potentiometer in accordance with a reference voltage, and wherein said additional coupling means couples said additional direction-responsive switching means to the potentiometer of said additional voltage means.

References Cited
UNITED STATES PATENTS

| | | | |
|---|---|---|---|
| 2,022,758 | 12/1935 | Corderman | 340—255 |
| 2,027,701 | 1/1936 | Rees | 340—255 |
| 2,141,373 | 12/1938 | Blount et al. | 324—52X |
| 2,304,535 | 12/1942 | Bush | 324—127X |
| 2,412,046 | 12/1946 | Hoare | 324—52X |
| 2,700,125 | 1/1955 | King et al. | 340—255X |
| 2,756,391 | 7/1956 | Petzinger | 324—126X |
| 3,135,911 | 6/1964 | Van Allen | 324—127X |

GERARD R. STRECKER, Primary Examiner

U.S. Cl. X.R.
317—43; 340—253